Figure 1:
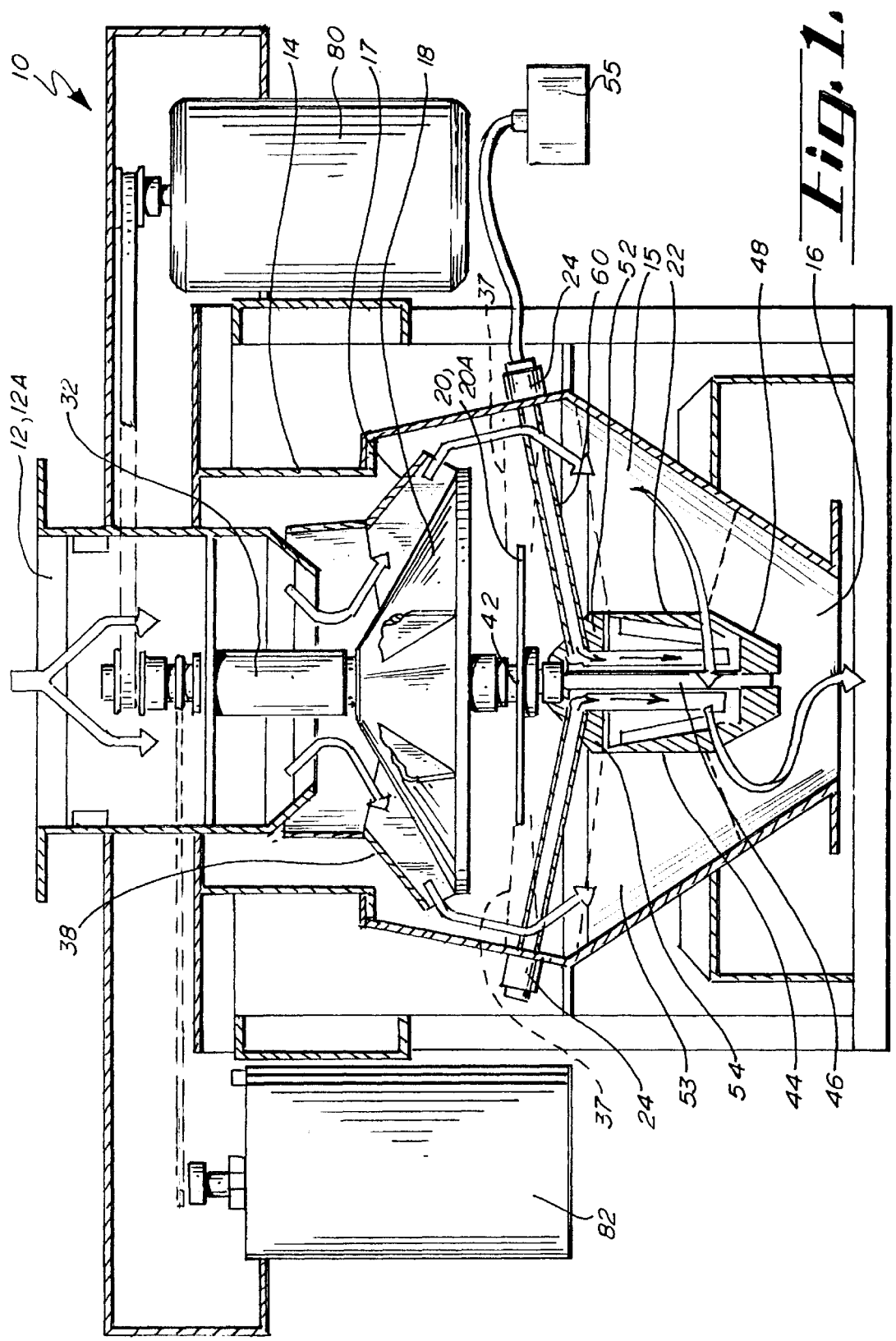
Figure 2:
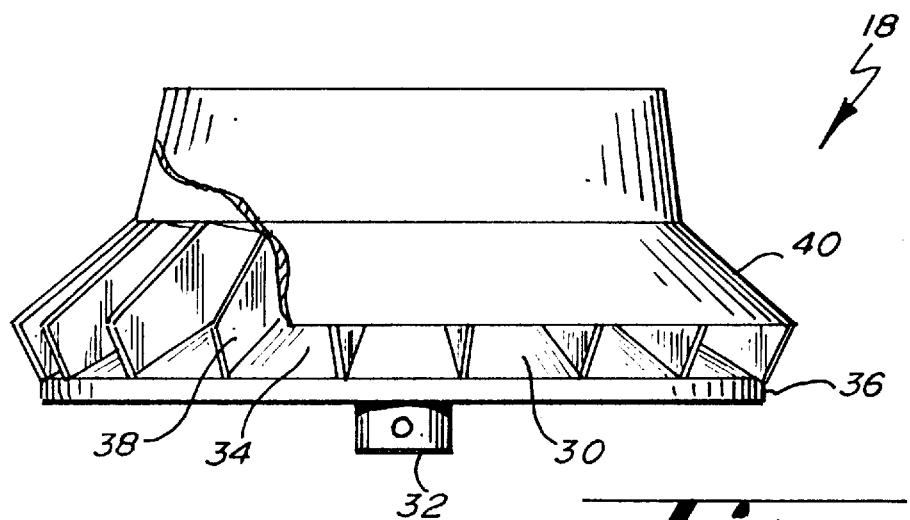
Figure 4:
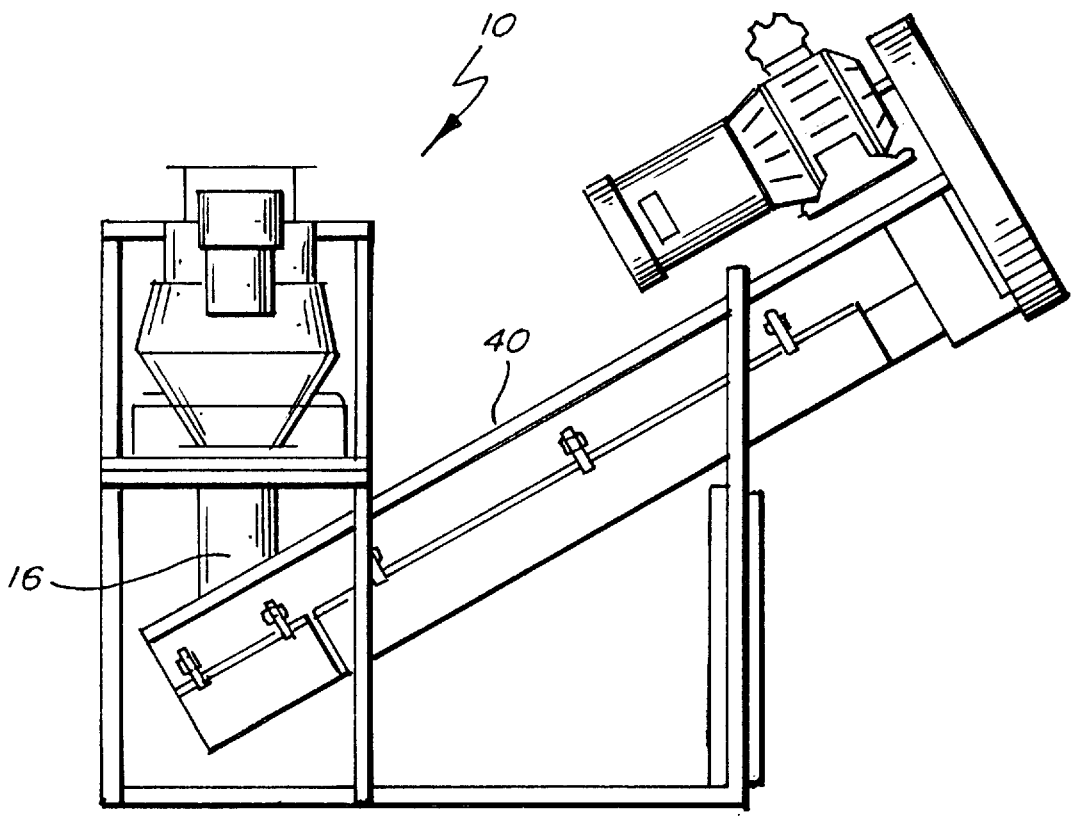
Figure 5:
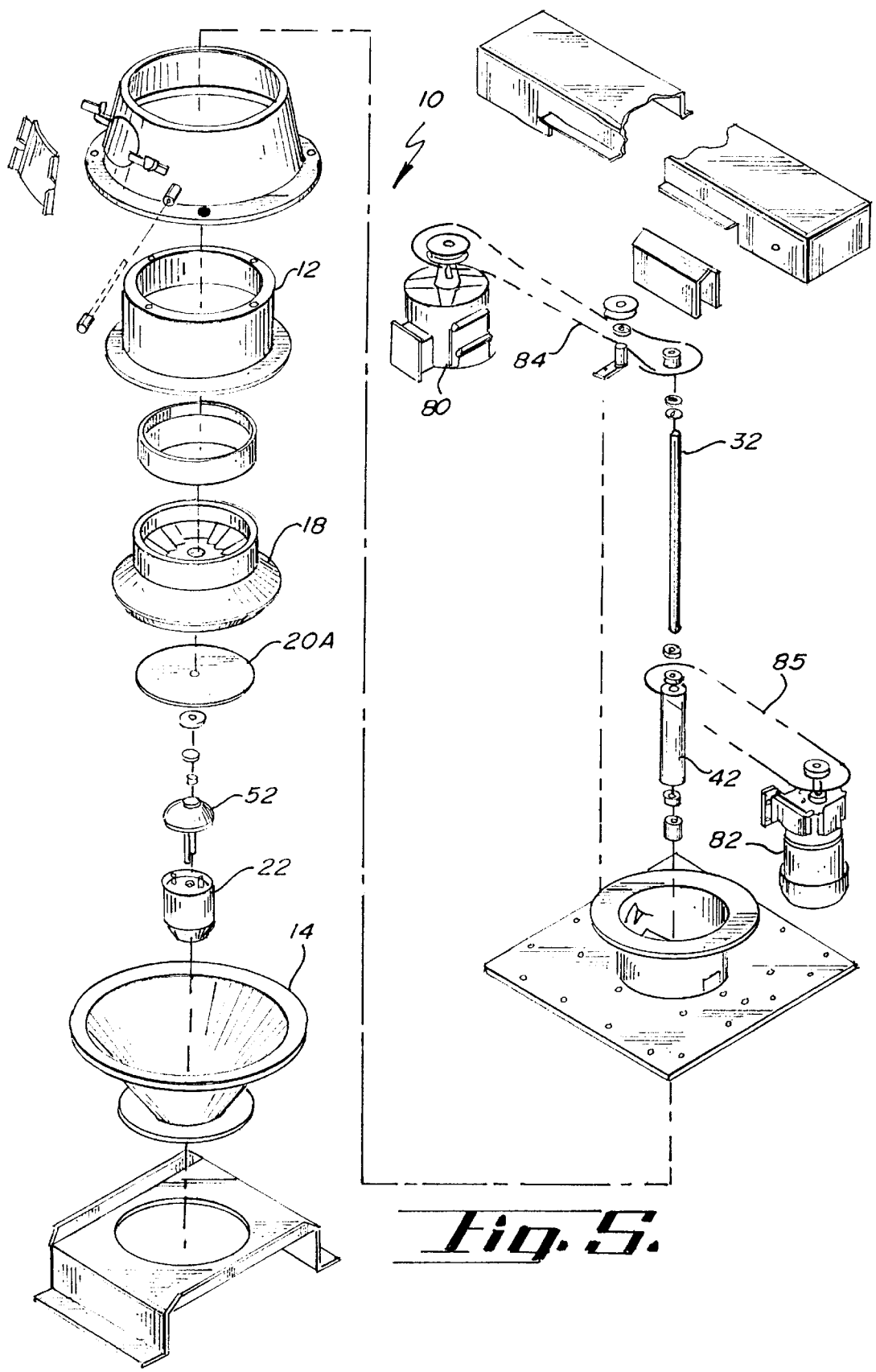

United States Patent
Lund

[11] Patent Number: 5,891,246
[45] Date of Patent: Apr. 6, 1999

[54] SEED COATING APPARATUS

[75] Inventor: Virgil D. Lund, Eden Prairie, Minn.

[73] Assignee: Gustafson, Inc., Eden Prairie, Minn.

[21] Appl. No.: 912,888

[22] Filed: Aug. 15, 1997

[51] Int. Cl.[6] .................................................. A23G 3/00
[52] U.S. Cl. ............................ 118/13; 118/24; 118/303;
   118/DIG. 16; 427/4; 427/212; 427/421;
   426/89; 426/93; 426/309; 47/1.5; 47/57.6;
   47/DIG. 9
[58] Field of Search .............................. 118/13, 24, 303,
   118/DIG. 16, 4; 427/212, 421; 426/89,
   93, 309; 47/1.5, 57.6, DIG. 9; 239/216,
   223; 222/190, 410, 195, 630

[56] References Cited

U.S. PATENT DOCUMENTS

| | | | |
|---|---|---|---|
| 477,909 | 6/1892 | Meier et al. ............................... | 34/568 |
| 2,561,392 | 7/1951 | Marshall .................................. | 427/213 |
| 2,561,393 | 7/1951 | Marshall .................................. | 427/213 |
| 2,561,394 | 7/1951 | Marshall .................................. | 427/213 |
| 2,862,511 | 12/1958 | Forsberg ................................. | 134/187 |
| 3,155,542 | 11/1964 | Cordell et al. .......................... | 118/303 |
| 3,213,867 | 10/1965 | McIntyre ................................ | 134/172 |
| 3,288,052 | 11/1966 | Hough .................................... | 99/485 |
| 3,605,688 | 9/1971 | Heden et al. ............................ | 118/303 |
| 3,912,231 | 10/1975 | Weber .................................. | 366/172.2 |
| 4,275,682 | 6/1981 | Weber .................................... | 118/303 |
| 4,407,217 | 10/1983 | Jackson ................................... | 118/303 |
| 4,596,206 | 6/1986 | Berge et al. ............................ | 118/303 |
| 4,689,249 | 8/1987 | Thygesen ............................... | 118/303 |
| 5,632,819 | 5/1997 | Geissler ................................. | 118/303 |

*Primary Examiner*—Laura Edwards
*Attorney, Agent, or Firm*—Palmatier, Sjoquist, Voigt & Christensen, P.A.

[57] ABSTRACT

A seed coating apparatus for applying a coating fluid to seeds, consists of a seed input, a housing connected to the seed input, the housing having a seed output, a rotating seed dispersing member within the housing receiving seed from the seed input, a device adapted to produce a moving air curtain between the seed dispersing member and the seed output, whereby coating fluid applied to the seeds is kept within the seed coating apparatus by the moving air curtain, a rotating fluid dispensing member between the air curtain producing device and the seed output, and a source of coating fluid entering the housing. The rotating fluid dispensing member may preferably be a rotating bowl with apertures arranged vertically along the periphery, so that the fluid is dispensed along a vertical axis.

12 Claims, 4 Drawing Sheets

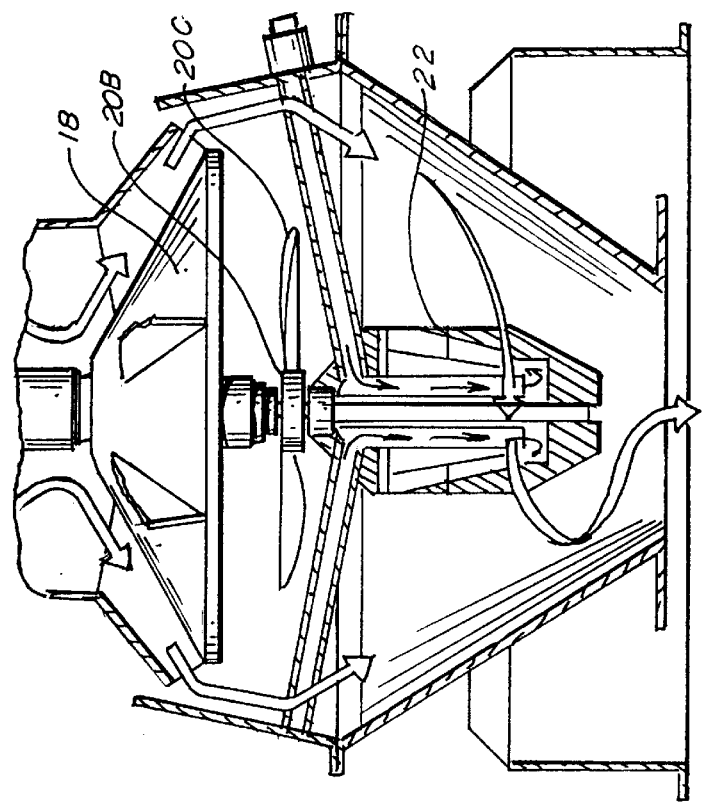
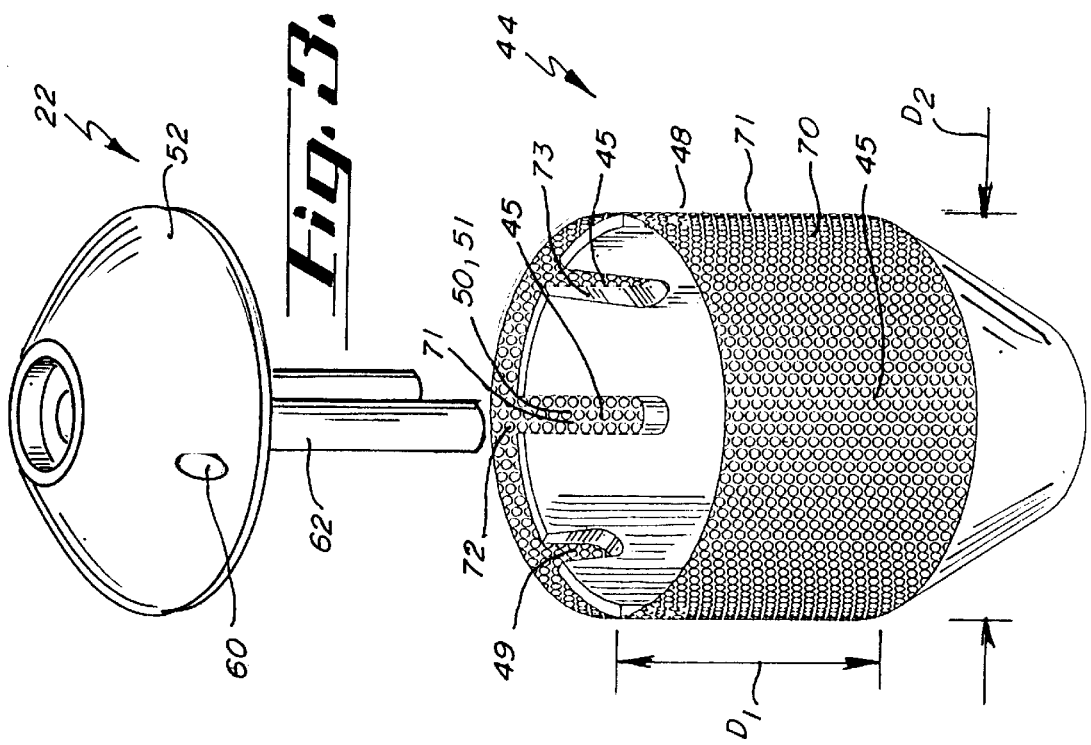

SEED COATING APPARATUS

BACKGROUND OF THE INVENTION

This invention relates to an apparatus for treating seeds by applying a liquid such as a herbicide or fungicide to the seed.

Seed coating apparatuses typically utilize a cylindrical or frustoconical housing in which seed is fed into the top of the housing which is dispersed in the open interior and falls downwardly though a seed coating region in which dispersed air born droplets of coating fluid contact and coat the falling seeds.

The prior art devices utilize various means for dispersing the seed and dispensing seed coating fluid in the seed coating region.

U.S. Pat. No. 3,288,052 to Hough discloses a rotating vaned structure with an open bottom for dispersing seed. A rotating concave plate receives the fluid which is discharged over the upper lip of the plate. The plate has no features to capture the fluid and accelerate it to the speed of the plate before discharge.

U.S. Pat. No. 2,862,511 to Forsberg discloses a rotating brush for dispensing the fluid. The brush receives fluid which is hurled outwardly from the brush fibers by the centrifugal force provided by the rotation. The seed dispersing portion comprises a non-rotating cone to disperse the seed.

U.S. Pat. No. 3,912,231 to Weber and assigned to the assignor of the invention of this application, discloses a rotating plate for dispensing the fluid. The fluid is poured on the plate and is hurled outwardly by centrifugal force. Weber discloses flutes in the plate to increase the vertical distance in which droplets are hurled outwardly.

The above prior art means for dispensing the fluid leave room for improvement in the coating efficiency of the mist produced. Non-uniform droplets, droplets discharged at less than optimal velocity, uneven density of the mist in the seed treating region, difficulty in cleaning the devices, seed coating regions which extend only a minimal distance vertically, and the inadvertent spread of fluid beyond the seed coating region are all problems associated with the above apparatuses.

It is highly significant that the fungicides utilized for coating seeds are extremely expensive and can be quite toxic. In order to be optimally effective, the fungicide must efficiently coat the entire outer surface of each seed with a minimal amount of fluid. Thus, the efficiency in coating seeds, containment of the seed coating fluid in limited areas of the apparatus, and having an apparatus which is easily cleanable are highly desirable features in this type of equipment.

SUMMARY OF THE INVENTION

A seed coating apparatus for applying a coating fluid to seeds, consists of a housing with a seed input and a seed output, a rotating seed dispersing member within the housing for receiving seed from the seed input, a fluid dispensing portion between the seed dispersing member and the seed output, and a device adapted to produce a moving air curtain between the seed dispersing member and the fluid dispensing portion, whereby coating fluid applied to the seeds is kept within a seed treating region by the moving air curtain. The fluid dispensing portion may preferably be a rotating bowl with apertures arranged vertically along the periphery of the bowl, so that the fluid is dispensed in a region extending along a vertical axis. The device for producing the moving air curtain is preferably a rotating member.

A principal object and advantage of the present invention is that it provides a moving air curtain between a seed dispersing member and the fluid dispensing member, so that fluid, which may be dispensed in the form of a fine mist, is kept below the air curtain. This prevents the seed dispersing member and the walls of the apparatus above the air curtain from becoming coated with the fluid, thus allowing easier cleaning of the apparatus and conservation of the fluid. Furthermore, this minimizes the opportunity of fluid from escaping into the environment.

Another principal object and advantage of the present invention is that the fluid dispensing member may be a rotating bowl with apertures arranged axially and vertically along its periphery so that the fluid is dispensed along a vertical axis. This provides a larger seed treating region and a more even distribution of the fluid than earlier devices. Generally, the prior art devices disperse the fluid in a horizontal plane.

Another object and advantage of the present invention is that it may include a rotating seed dispersing member in the form of an inverted, rotating cone with a plurality of vanes along the cone's surface and a frustoconical housing engaging the vanes. This produces a more even distribution of seed by causing the seeds to travel along the vanes where they are thrown outwardly and fall downwardly in a spiral at the outer periphery of the housing in an even curtain.

Another object and advantage of the present invention is that the rotating seed dispersing member and the rotating fluid dispensing member may be driven by coaxial shafts, thus saving space within the apparatus, improving seed flow and seed treating efficiency.

Another object and advantage of the present invention is that the rotating bowl dispenses fluid only through defined apertures. This produces a more even mist than earlier devices, which merely threw the fluid out horizontally with no flow restriction or regulation.

Another object and advantage of the present invention is that the bowl is substantially closed at its top with a non-rotating cap through which fluid is introduced. The substantially closed bowl keeps the seed out of the fluid dispensing portion aiding in maintaining the cleanliness of the apparatus. Also, this produces a more even fluid distribution and economizes on fluid more than earlier devices, which merely dripped or poured the fluid onto a rotating disk.

Other advantages of the present invention will be identifiable from the drawings, detailed description, and claims.

BRIEF DESCRIPTION OF THE DRAWINGS

FIG. 1 is a front partial sectional elevational view of the apparatus of the present invention.

FIG. 2 is a detailed perspective view of the rotating seed dispensing member of the present invention.

FIG. 3 is a detailed exploded view of the rotating fluid dispensing member of the present invention.

FIG. 4 is a schematic showing the environment of the present invention.

FIG. 5 is an exploded view of the parts of the present invention.

FIG. 6 is a schematic showing a second embodiment of the air curtain producing device of the present invention.

DETAILED DESCRIPTION OF THE PREFERRED EMBODIMENTS

The seed coating apparatus of the present invention is generally shown in the figures as reference numeral 10.

The seed coating apparatus 10 consists of a seed input 12 on a housing 14 with an open interior 15 and a seed output 16, a seed dispersing portion 17 configured as a rotating seed dispersing member 18 within the housing 14, the seed dispersing member 18 receiving seed from the seed input 12, an air moving portion 20 adapted to produce a moving air curtain below the seed dispersing member 18, a fluid dispensing portion 22 between the air curtain producing device 20 and the seed output 16, and a source 24 of coating fluid entering the housing 14.

Seed is fed into the apparatus 10 at the seed input 12 and travels the apparatus 10 under the influence of gravity. In the preferred configuration, the apparatus 10 is therefore vertically arranged. In the preferred embodiment, the seed input 12 is a vertical duct 12A entering the housing 14.

Preferably, the rotating seed dispersing member 18 consists of a cone 30 rotating on a first shaft 32. The cone 30 has a surface 34, a rim 36, and a seed dispersing output 37. As seen in the figures, the cone 30 converges upwardly within the housing 14. Preferably, the rotating seed dispensing member 18 also includes a plurality of vanes 38 spaced along the surface 34 of the cone 30 adapted to direct the seed with the rotating seed dispensing member 18. A frustoconical top 40 may engage the vanes 38 as shown in FIG. 2.

In the preferred embodiment, the air curtain 37 producing device 20 is a rotating disk 20A, as shown in FIG. 1. The disk 20A may suitably rotate at a speed of about 1000 rpm. The disk 20A rotates on a second shaft 42. Preferably, the first shaft 32 and second shaft 42 are concentric, as shown in FIG. 1.

Alternatively, as shown in FIG. 6, the air curtain producing device 20 may be a fan 20B or the like with blades 20C or with an external source of compressed air suitably injected into the region between the seed dispersing member 18 and the fluid dispensing member 22.

In yet another embodiment, the air curtain producing device 20 may be one or more compressed air inlets 20D.

In the preferred embodiment, the rotating fluid dispensing member 22 consists of a bowl portion 44 rotating on the second shaft 42 and having a periphery 48 with apertures 50 whereby the fluid is dispensed outwardly by centrifugal force at fluid discharge regions 49. Preferably, the third shaft 46 is an extension of and integral with the second shaft 42. The disk 20A and the bowl portion 44 then rotate at the same speed. However, separate shafts could also be used, thereby allowing the disk 20A and bowl portion 44 to rotate at different speeds. Details of the bowl portion 44 are in FIG. 3.

To provide maximum fluid dispersal, it is preferred that the apertures 50 be arranged vertically along the periphery 48 into slots 51, defining an upwardly extending discharge region 45 so that the fluid can be dispersed along a vertical axis, that is, along dimension D1 of FIG. 3 into a fluid treatment region 53 adjacent to the bowl 44 with the top and bottom borders of the region defined by the dashed lines 55.

The apparatus 10 may also include a stationary cap 52 engaging and substantially closing the rotating bowl portion 44, as seen in FIGS. 1 and 3. A slight gap 54 between the bowl portion 44 and cap 52 allows unrestricted rotation of the bowl portion while still preventing seed from entering the bowl portion and allowing excessive levels of fluid in the bowl to escape.

A source 55 of coating fluid 24 is preferably a fluid duct 60 entering the stationary cap 52. The duct 60 communicates with vertical tubes 62 within the bowl portion 44, thereby delivering fluid to the interior of the bowl portion 44.

As best seen in FIG. 3, the apparatus 10 also may preferably include a screen 70 on the bowl portion 44 having a plurality of holes 72 therein. Some of the holes 72 are aligned with apertures 50 in the bowl for dispensing the fluid. The screen may preferably be constructed of stainless steel. The screen 70 rotates with the bowl portion 44. The screen may be replaced and interchanged to provide varying misting parameters of the fluid dispensing member such as droplet size and volume.

The screen forms an outer fluid restriction wall 71 for interior compartments 73 that extend radially inward. The compartments 73 capture the fluid before it discharged thru the apertures, thus effectively accelerating the fluid to the approximate velocity of the rotating bowl portion 44. This apparently allows the fluid to discharge at a higher velocity creating a finer and a more dense mist than the prior art fluid dispersing portions configured as plates or bowls which allowed the fluid to move circumferentially on the plate or bowl prior to discharge.

FIG. 5 is an exploded view of the apparatus 10, showing its component parts. The first shaft 32 is driven by a first motor 80, and the second shaft 42 is driven by a second motor 82. Torque from the motors 80, 82 may be transmitted to the shafts 32, 42 by any suitable power transfer means (the figures show the use of belt 84 and chain 85 for this purpose).

FIG. 4 shows the environment of the apparatus 10. Seed falling out of the seed output 16 may preferably fall onto a conveyor 90 for transport to a further location.

The operation of the apparatus 10 illustrates its advantages. Seed enters the apparatus 10 through the seed input 12, under the influence of gravity. The falling seed then encounters the rotating seed dispersing member 18. The seed hits the surface 34 of the inverted cone 30 or the vanes 38 and then travels toward the seed dispersing output 37 as the cone 30 rotates. The vanes 38 channel the seed in a circular direction as it falls. The frustoconical housing 40 keeps the seeds within defined channels. As the member 18 rotates, it thus produces an even distribution of seed causing the seed to pass in an even curtain tumbling and falling in spiral direction through the seed treating region.

Below the member 18, the air curtain producing device 20 produces a moving air curtain through which the seed falls in a downward spiral.

The seed then encounters mist from the fluid dispensing member 22, which evenly coats the seed as it falls through the mist. The spinning and tumbling action of each individual seed as it passes in a spiral direction through the seed treating region facilitates the complete coating of each individual seed. Because of the seed action and the unique construction of the fluid dispensing member 22, i.e., a bowl with vertically arranged apertures 50, the seed is more efficiently and evenly coated with mist than in previous devices, which merely threw the fluid out horizontally in a narrow seed treating region.

The moving air curtain keeps the mist below the air curtain and the member 18. This prevents the walls of the apparatus 10 above the air curtain from becoming coated with the fluid, thus allowing easier cleaning of the apparatus. This also helps to prevent the fluid, which may be toxic, from escaping into the environment such as where fluid flow would be inadvertently left on when the grain is not being fed into the device.

The inventor has found that utilization of the above invention provides significantly more complete coating of each seed while utilizing less fungicides. Appropriate rotational speeds are 90 r.p.m. for the seed dispersing member and 3600 r.p.m. for the bowl portion.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A seed treating apparatus for applying a fluid to seeds, the apparatus comprising:
   a housing with an upwardly positioned seed input, an open interior below said seed input and a seed output;
   a rotating seed dispensing portion positioned below the seed input and having a substantially vertical axis;
   a fluid dispensing portion positioned below the seed dispensing portion, the fluid dispensing portion having a substantially vertical axis and comprising a rotating bowl portion having a substantially cylindrical and substantially upright rotating wall with a plurality of openings in said wall for dispensing the fluid from a vertically extending region through said wall, and
   a fluid supply duct extending to the fluid dispensing portion.

2. The seed treating apparatus of claim 1 wherein the rotating bowl portion has a plurality of upright fluid dispensing regions.

3. The seed treating apparatus of claim 1 wherein the rotating bowl portion has a plurality of upwardly extending slots for capturing and rotating the fluid before said fluid is discharged from the fluid dispensing portion.

4. The seed treating apparatus of claim 1 further comprising a plurality of fluid capture compartments to capture and rotate the fluid before said fluid is discharged from the fluid dispensing portion, each compartment having an exterior compartment wall for restricting the outward passage of the fluid, the wall having at least one aperture for discharging said fluid.

5. The seed treating apparatus of claim 4 wherein the compartment comprise upright slots in the bowl portion and the exterior compartment wall at each compartment has a plurality of upwardly spaced apertures for discharging the fluid.

6. The seed treating apparatus of claim 1 wherein the bowl has an open top and further comprises a non-rotating cover portion substantially closing said open top.

7. A seed coating apparatus for treating seed with a fluid, the apparatus comprising:
   a housing with an input, and open interior and an output;
   a rotating seed dispensing member having a substantially vertical axis and positioned in the open interior below said input;
   a fluid dispensing portion positioned in the open interior and comprising a substantially closed container with a substantially upright and apertured outer fluid restriction wall rotating about a substantially vertical axis; and,
   a fluid supply duct extending to the fluid dispensing portion and connecting to a fluid source for providing fluid to the fluid dispensing portion.

8. The seed coating apparatus of claim 7 wherein the fluid dispensing portion comprises a rotating bowl portion with an open top, and a non-rotating cover substantially covering the open top, wherein the rotating bowl portion comprises the rotating apertures outer fluid restriction wall.

9. A seed coating apparatus comprising:
   a housing with an upper seed input, an open interior below said seed input, a seed output below said open interior;
   a rotating seed dispensing member below the seed input in the open interior;
   a rotating fluid dispensing portion below the rotating seed dispensing member, the fluid dispensing portion having a rotating upright outer fluid restriction wall with circumferentially and axially spaced apertures with a plurality of compartments extending radially inwardly from said fluid restriction wall for capturing and rotating the fluid in the fluid dispensing portion before the fluid is discharged from the apertures; and
   a fluid supply duct extending to the fluid dispensing portion and connecting to a fluid source for providing fluid to the fluid dispensing portion.

10. A seed treating apparatus for applying a fluid to seeds, the apparatus comprising:
    a housing with an upwardly positioned seed input, an open interior below said seed input and a seed output;
    a rotating seed dispensing portion positioned below the seed input and having a substantially vertical axis;
    a fluid dispensing portion positioned below the seed dispensing portion, the fluid dispensing portion having a substantially vertical axis and comprising a rotating substantially closed bowl portion having an upwardly extending, substantially cylindrical wall with a plurality of axially spaced openings in said wall for dispensing the fluid from a vertically extending region; and,
    a fluid supply duct extending to the fluid dispensing portion.

11. The seed treating apparatus of claim 10, wherein the rotating bowl portion has a plurality of upwardly extending slots positioned radially inwardly from the axially spaced openings in the substantially cylindrical wall, for capturing and rotating the fluid before said fluid is discharged from the axially spaced openings of the fluid dispensing portion.

12. The seed treating apparatus of claim 10, further comprising a plurality of rotating fluid capture compartments to capture and rotate the fluid before said fluid is discharged from the axially spaced openings, each compartment having an exterior compartment wall for restricting the outward passage of the fluid, the wall having at least one aperture for discharging said fluid.

* * * * *

UNITED STATES PATENT AND TRADEMARK OFFICE
CERTIFICATE OF CORRECTION

PATENT NO. 5,891,246
DATED : Apr. 6, 1999
INVENTOR(S) : Virgil D. Lund

It is certified that error appears in the above-indentified patent and that said Letters Patent is hereby corrected as shown below:

col. 1, line 9: please delete the word "though" and insert in its place --through-- col. 6, line 8: please delete the word "apertures" and insert in its place --apertured--

Signed and Sealed this

Twentieth Day of June, 2000

Attest:

Q. TODD DICKINSON

Attesting Officer      Director of Patents and Trademarks